Dec. 20, 1949     V. T. BUETTNER ET AL     2,491,951
ANIMAL RESTRAINING DEVICE
Filed March 9, 1948
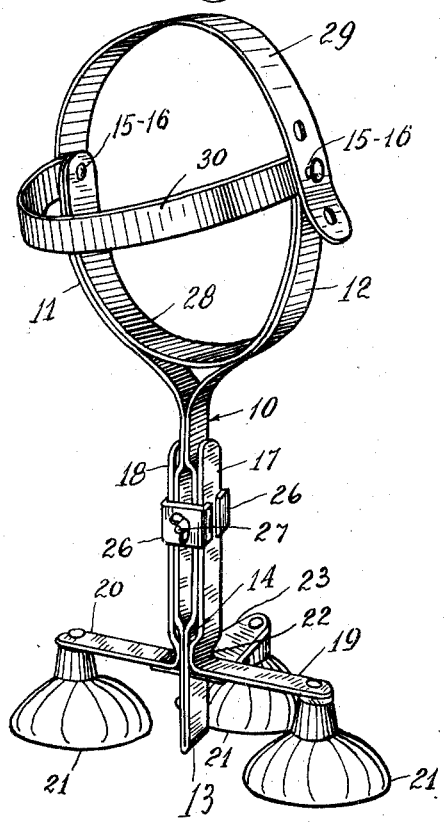
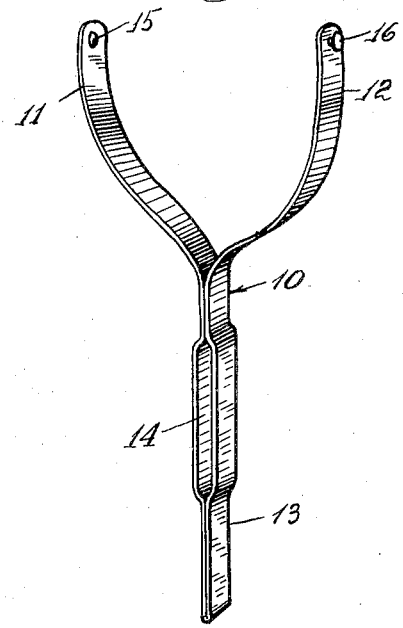
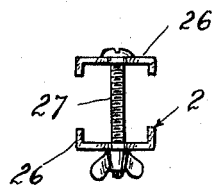
Vincent T. Buettner
William J. Buettner
Inventors
By Rseph Donath
Attorney Patented Dec. 20, 1949

2,491,951

UNITED STATES PATENT OFFICE 2,491,951

ANIMAL RESTRAINING DEVICE

Vincent T. Buettner and William J. Buettner, Pittsburgh, Pa.

Application March 9, 1948, Serial No. 13,796

5 Claims. (Cl. 119—96)

This invention relates to an improved device for restraining animals and, in particular, to a device for holding dogs while being bathed.

The general object of our invention is to provide a simple inexpensive and effective device for the purpose stated.

A further object of the invention is to provide a restraining device which can quickly be secured to the bottom of a tub or other receptacle.

Another object of the invention is the provision of a restraining device which can easily be adjusted to various heights to suit dogs of different sizes.

In a preferred embodiment of the invention, we provide a device comprising a base portion having a plurality of vacuum cup feet thereon and a pair of spaced upstanding guides. A two-pronged fork has a shank vertically adjustable between said guides and is secured in position by a suitable clamp. The fork is adapted to receive the body of an animal between its prongs and is provided with a girth or surcingle and a chest band. The upper part of the girth is removably secured at one end to one prong of the fork so it may be opened to permit a dog to be placed with the fore-part of his body engaging the fork back of the forelegs.

A complete understanding of the invention may be obtained from the following detailed description which refers to the accompanying drawing, illustrating the present preferred embodiment, wherein like numerals of reference designate corresponding parts throughout the several views, Figure 1 is a perspective view of our improved restraining device, Figure 2 is a perspective view showing the fork alone, and Figure 3 is a plan view of a clamp for securing the shank of the fork in adjusted position.

Referring in detail to the drawings, a fork 10 has spaced prongs 11 and 12 and a shank 13. The fork 10 is conveniently composed of a pair of metal straps or, as shown, one piece of strap bent back on itself. The straps are in contact at the top and bottom of the shank but are spaced apart in the intermediate portion, leaving an elongated opening or slot 14, for a purpose which will appear shortly.

The fork has its prongs shaped and spaced suitably to partially embrace the body of a dog and particularly its forward trunk or thorax. The prong 11 has a hole 15 therethrough and the prong 12 has a headed stud or rivet 16 extending laterally therefrom.

The shank 13 of the fork and particularly the intermediate portion thereof wherein the metal straps are spaced apart, is slidable between a pair of spaced vertical guides 17 and 18. The guides may be made of metal or other suitable material and their lower ends are bent at a right angle to provide tongues 19 and 20 extending outwardly in opposite directions. These tongues have vacuum-cup feet 21 secured adjacent their outer end.

The straps forming the guides 17 and 18 are bent inwardly as at 22, just above the tongues 19 and 20, so as to engage the lower end of the shank 13 snugly therebetween. The tongues 19 and 20 of the guides are bridged by the inner end of a tongue 23 of metal plate which is slotted so as to admit the shank 13. The tongues 19 and 20 are welded or otherwise secured to the tongue 23, in flatwise-engaging relation, the tongue 23 extending at right angles to the central line through the tongues 19 and 20. The three tongues 19, 20 and 23 form the base of the device, the tongue 23 being provided with a vacuum-cup foot 21 similar to those secured to the tongues 19 and 20.

When the shank of the fork has been disposed between the guides 17 and 18 and adjusted vertically therein to the desired position, it may be secured in adjusted position by a clamp 25 including a pair of flange clips 26 and a bolt 27 extending centrally therethrough. As shown in Figure 1, the clamps are adapted to embrace the guides 17 and 18 and the shank 13 therebetween so as to secure them frictionally against relative longitudinal movement when the wing nut on the bolt 27 is screwed home. It will be understood that the shank 13 is of substantially the same width as the guides so that all these parts will be gripped simultaneously by the clips 26.

The fork 10 is fitted with a girth or surcingle of leather strap including a lower portion 28 closely overlying the inner face of the spaced prongs of the fork and riveted thereto. The girth also includes an upper strap 29 having one end riveted to the prong 11 of the fork and to the other end provided with a plurality of holes whereby it may be detachably and adjustably secured to the stud 16 on the prong 12. A chest-band 30 of leather strap is also riveted to the prongs 11 and 12 and extends laterally therefrom.

The manner of using the device will doubtless be apparent from the foregoing description without further explanation. In any event it will suffice to state that, after adjusting the shank between the guides as previously explained, to approximately the proper position for the height of the dog to be washed, the girth is opened up and the dog placed in the fork with the fore-legs on the side toward which the chest-band extends. The girth is then closed by securing the free end thereof to the stud 16. The dog and restraining device are then placed in a tub and the vacuum-cup feet 21 are pressed down firmly enough to secure a grip on the bottom thereof. Alternatively the device may be first placed in the tub and the dog then secured therein as just explained.

It will be apparent immediately that the device will serve effectively to restrain a dog in the tub while he is being bathed. He cannot back out of the girth if it be drawn snug and is restrained from jumping forward by the chest-band. The vacuum feet secure a tight grip on the bottom of the tub and prevent bodily removal of the device while permitting limited sidewise as well as backward and forward movement so that the restraint is not so rigid as to be uncomfortable or irritating to the animal. However the best results may be obtained by elevating the yoke to lift the dog so that he has no purchase on the tub bottom by his fore-feet.

The invention is simple in construction, easy to use and remarkably effective, thus facilitating what is ordinarily a tiresome and laborious task because of the difficulty usually encountered in trying to hold a dog with one hand while scrubbing with the other. The advantage of the feature of vertical adjustability to accommodate dogs of various sizes is apparent. It does, however, permit the sale of a single style and pattern of the restraining device to owners of dogs of almost all sizes, thus reducing the cost of manufacture and broadening the possible market.

Although we have illustrated and described but a preferred embodiment of the invention, it will be recognized that changes in the details of construction and arrangement disclosed may be made without departing from the spirit of the invention or the scope of the appended claims.

We claim:

1. An animal-restraining device comprising a base portion, a plurality of vacuum-cup feet secured thereto, a pair of spaced guides upstanding on said base, a two-pronged fork adapted to receive an animal's trunk, having a shank slidable between said guides, a clamp securing said shank in adjusted position relative to said guides, and a girth and chest-band secured to the upper end of the prongs of the fork.

2. A device as defined by claim 1 characterized by said base portion including tongues bent outwardly in opposite directions from said guides.

3. A device as defined by claim 2 characterized by a third tongue bridging the first-mentioned tongues and secured thereto.

4. An animal restraining device comprising a base portion, a plurality of vacuum-cup feet secured thereto, a guide upstanding on said base portion, a two-pronged fork having a shank slidably engaging said guide, a clamp securing the shank to the guide in adjusted position, and a girth secured to said fork and adapted to admit and secure an animal's trunk.

5. A device as defined by claim 1 characterized by said shank being composed of two metal straps side-by-side, said straps being spaced apart for a portion of the length of the shank to admit a bolt for securing said clamp.

VINCENT T. BUETTNER.
WILLIAM J. BUETTNER.

REFERENCES CITED

The following references are of record in the file of this patent:

UNITED STATES PATENTS

| Number | Name | Date |
|---|---|---|
| 1,109,772 | Leyh | Sept. 8, 1914 |
| 1,879,915 | Smoot | Sept. 27, 1932 |
| 2,026,383 | Gyulay | Dec. 31, 1935 |
| 2,144,876 | Garnett | Jan. 24, 1939 |
| 2,229,411 | Hughes | Jan. 21, 1941 |
| 2,276,779 | Isenberg | Mar. 17, 1942 |
| 2,285,900 | Chapman | June 9, 1942 |
| 2,438,979 | Short | Apr. 6, 1948 |

FOREIGN PATENTS

| Number | Country | Date |
|---|---|---|
| 563,592 | Germany | Nov. 7, 1932 |